United States Patent
Saito et al.

(10) Patent No.: US 8,549,914 B2
(45) Date of Patent: Oct. 8, 2013

(54) SENSOR STRUCTURE

(75) Inventors: Takayuki Saito, Hitachinaka (JP);
Chihiro Kobayashi, Naka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 2 days.

(21) Appl. No.: 13/218,770

(22) Filed: Aug. 26, 2011

(65) Prior Publication Data

US 2012/0048015 A1 Mar. 1, 2012

(30) Foreign Application Priority Data

Aug. 31, 2010 (JP) .................................. 2010-193074

(51) Int. Cl.
*G01D 11/24* (2006.01)
*G01L 19/14* (2006.01)
*G01P 1/02* (2006.01)

(52) U.S. Cl.
USPC .......................................................... 73/431

(58) Field of Classification Search
USPC .......................................................... 73/431
See application file for complete search history.

(56) References Cited

U.S. PATENT DOCUMENTS

| | | | |
|---|---|---|---|
| 6,034,421 A * | 3/2000 | Tokunaga ..................... | 257/666 |
| 6,186,009 B1 * | 2/2001 | Miyano et al. ................. | 73/756 |
| 6,427,668 B1 | 8/2002 | Igarashi et al. | |
| 2003/0094050 A1 * | 5/2003 | Miyazaki et al. .............. | 73/753 |
| 2004/0055387 A1 * | 3/2004 | Miyazaki et al. .............. | 73/754 |
| 2005/0115328 A1 | 6/2005 | Hayashi et al. | |
| 2007/0017294 A1 * | 1/2007 | Asada et al. ................... | 73/754 |
| 2008/0302173 A1 | 12/2008 | Saito et al. | |
| 2010/0031737 A1 * | 2/2010 | Saito et al. ................. | 73/114.33 |
| 2011/0072894 A1 * | 3/2011 | Saito et al. ................. | 73/114.34 |
| 2012/0048015 A1 * | 3/2012 | Saito et al. ....................... | 73/431 |
| 2012/0079879 A1 * | 4/2012 | Saito et al. ................. | 73/114.33 |
| 2012/0198925 A1 * | 8/2012 | Saito et al. ................. | 73/114.33 |
| 2012/0198943 A1 * | 8/2012 | Saito et al. ................. | 73/861.42 |

FOREIGN PATENT DOCUMENTS

| | | |
|---|---|---|
| DE | 10 2007 057 903 A1 | 6/2009 |
| EP | 1 482 291 A1 | 12/2004 |
| EP | 2 154 494 A1 | 2/2010 |
| EP | 2154494 A1 * | 2/2010 |
| JP | 3523022 B2 | 2/2004 |
| JP | 2004-354294 A | 12/2004 |
| JP | 2004354294 A * | 12/2004 |
| JP | 2008-304232 A | 12/2008 |

OTHER PUBLICATIONS

European Search Report dated Nov. 28, 2011 (Six (6) pages).

* cited by examiner

*Primary Examiner* — Lisa Caputo
*Assistant Examiner* — Jamel Williams
(74) *Attorney, Agent, or Firm* — Crowell & Moring LLP

(57) ABSTRACT

Provided is a sensor structure capable of improving the reliability of connecting parts of electronic components and achieving excellent productivity and reduction in size and weight, for example, when electronic components are externally mounted on input/output terminals of a sensor. A relationship between a linear expansion coefficient for a housing serving as a base of a structure and a linear expansion coefficient of a resin material for a sensor casing of a sensor to be mounted is set to satisfy "sensor casing<linear expansion coefficient α<housing". When electronic components are externally mounted, the electric components are mounted on input/output terminals which are integrally formed on the side of a component having a small linear expansion coefficient, i.e., on the side of the sensor casing.

6 Claims, 5 Drawing Sheets

SENSOR STRUCTURE

BACKGROUND OF THE INVENTION

1. Field of the Invention

The present invention relates to a sensor integrated structure suitable for physical quantity measurement relating to intake air in an internal combustion engine, and an internal combustion engine control device that uses the sensor integrated structure 2. Background Art A heating resistor type mass air flow measurement device relating to a flow measuring technique, for example, is known as a physical quantity measuring technique relating to intake air for internal combustion engines (see JP Patent No. 3523022). The heating resistor type mass air flow measurement device utilizes the correlation of the quantity of heat taken from a heating resistor with inflow discharge. The heating resistor type mass air flow measurement device is capable of directly measuring mass flow required to control combustion in an engine and is thus widely used as a flowmeter for air-fuel ratio control particularly in an automobile.

As another physical quantity measuring technique relating to intake air for internal combustion engines, there is known a sensor including a flow measurement device, a pressure measurement device, a humidity sensing device, and the like which are integrated together, the sensor having a function of measuring a plurality of physical quantities. For example, JP Patent Publication (Kokai) No. 2008-304232A discloses an example in which an air flow sensor and a pressure sensor are integrated together.

SUMMARY OF THE INVENTION

Automobiles that use an electronically-controlled fuel injection system have been common and become more sophisticated in performance and function in recent years. In this case, an engine room is internally crammed with various sensors and control instruments. Furthermore, a wire harness that interconnects various sensors and control instruments as well as a control unit configured to control the sensors and control instruments, for example, is complicatedly intricate.

In such circumstances, there has been a demand to reduce the number of components and improve the appearance of the interior of the engine room by integrating the plurality of sensors and control instruments together. For example, in a certain measure, the above-described flow measurement device is integrated with a temperature sensing device and even a semiconductor pressure measurement device, a humidity sensing device, and the like to allow connectors to be shared. This enables a reduction in the number of steps required to assemble components together into a vehicle and simplification of the wire harness.

In conventionally mainstream structures, the heating resistor type mass air flow measurement device is integrated with a temperature sensing device. However, as heating resistor type mass air flow measurement devices are integrated with the above-described pressure measurement device and humidity sensing device in the future, various technical problems are expected to occur.

In particular, in order to promote multifunction of the sensor, the sensor is inevitably formed of a larger number of components compared to the conventional type. This raises concerns about a problem of mounting space, complicacy of manufacturing processes, and even an increase in the number of nodes in the multiple component configuration, i.e., the reliability in connecting parts and the like.

For example, when a flow measurement device and a pressure measurement device are integrated and a chip capacitor is externally mounted and connected so as to improve the electromagnetic interference preventing function of the pressure measurement device, a distance between connector terminals of the chip capacitor or the like is displaced due to expansion/contraction of a resin, for example, which is caused by a change in environmental temperature, depending on a resin material for holding counterpart terminals to be mounted. As a result, for example, connecting parts between the chip capacitor and each terminal fatigue due to a solder, a conductive adhesive, or the like, which may finally lead to break. In this case, the pressure measurement device contributes to engine control in the state of being considerably deteriorated in the intended electromagnetic interference preventing function. Thus, when a signal from the pressure measurement device is used for throttle opening control, for example, a malfunction may occur in the pressure measurement device.

In view of the foregoing, it is an object of the present invention to provide a sensor structure that is excellent in reliability and productivity and achieves reduction in size and weight, for example, when a pressure measurement device, a humidity sensing device, and the like are integrated with a flow measurement device.

To deal with the above-mentioned problems, the following means is provided.

A relationship between a linear expansion coefficient for a housing serving as a base of a structure and a linear expansion coefficient for a resin material used for a sensor casing of a sensor to be mounted is set to satisfy "sensor casing<linear expansion coefficient a<housing". In the case of externally mounting electronic components, the electric components are mounted on input/output terminals which are integrated on the side of the component having a small linear expansion coefficient, i.e., on the side of the sensor casing.

In this structure, the expansion/contraction of the resin material of the sensor casing (e.g. PPS) itself associated with an ambient temperature change is extremely small. Therefore, the reliability of connecting parts of the electronic components can be ensured even when the electronic components are connected to bridge input/output interface terminals.

According to the present invention, it is possible to externally mount electronic components in order to improve performances such as the electromagnetic interference preventing function of a sensor to be mounted. Consequently, the reliability of connection between electronic components can be ensured for a long period of time, and simple external mounting can be applied. This achieves an improvement in productivity and a reduction in cost.

Moreover, it is possible to provide a multifunction sensor that is excellent in performance and quality for automobiles and is capable of simultaneously detecting various physical quantities such as an air flow and an intake pressure.

DETAILED DESCRIPTION OF THE PREFERRED EMBODIMENTS

Figure 1:
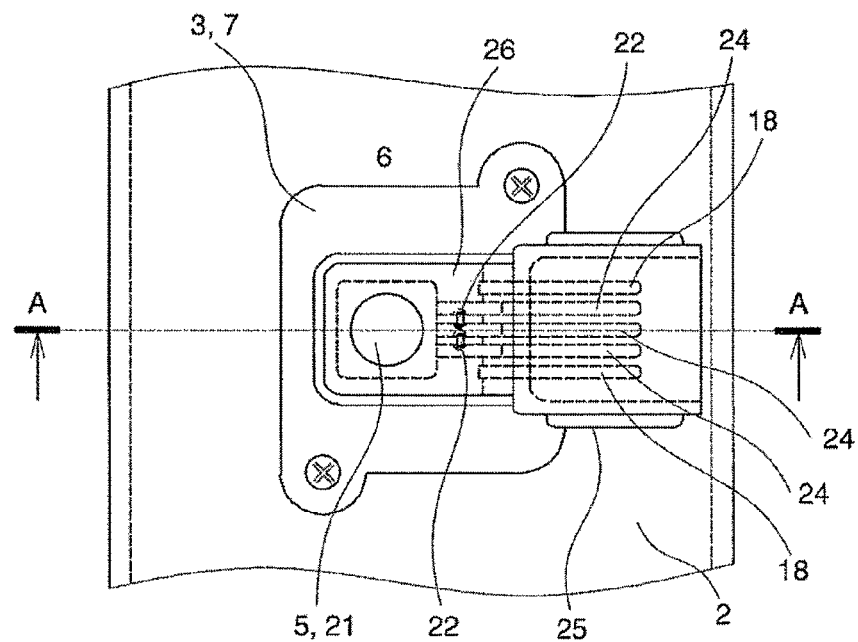
FIG. 1 is a diagram of a sensor structure showing an embodiment of the present invention and a sectional view of the sensor structure taken along the line A-A.
Figure 1:
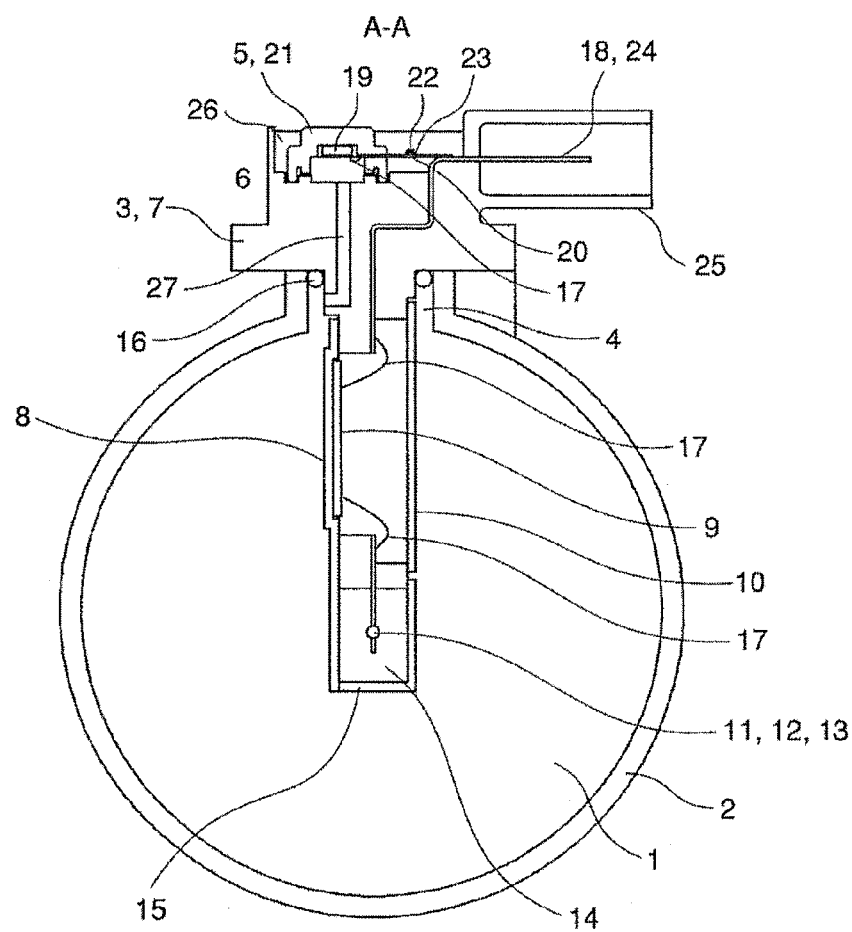

An embodiment of the present invention will be described with reference to FIG. 1. A main air flow passage component (intake air passage structural part) 2 constituting a main air flow passage (hereinafter also referred to as an intake line or simply an intake tube) 1 includes a sensor installation hole 4 formed in a part of the main air flow passage component 2. A multifunction sensor 6 integrating a heating resistor type mass air flow measurement device 3 and a pressure measurement device 5 is inserted through the sensor installation hole 4.

The heating resistor type mass air flow measurement device 3 includes a housing 7 as well as a base plate 8, a cover 10 for protecting an electronic circuit board 9, a heating resistor 11 for measuring an air flow, an air temp compensation resistor 12 for use in measurement of an air flow, an intake air temperature sensor 13 used on a vehicle side, a bypass air passage 14 for packaging the heating resistor 11, the air temp compensation resistor 12, and the like, a bypass air passage structural part 15 for constituting the bypass air passage 14, a seal material 16 for sealing the main air flow passage 1 and the outside, and the like. The heating resistor 11, the air temp compensation resistor 12, and the intake air temperature sensor 13, which detect an intake air flow and an intake air temperature, are connected to the electronic circuit board 9 through a wire bonding material 17. Further, the electronic circuit board 9 is electrically connected to connector terminals 18 through the wire bonding material 17 in a similar manner, to thereby input and output signals to and from the outside through a connector 25.

The pressure measurement device 5 mounted on the housing 7 of the heating resistor type mass air flow measurement device 3 has a structure in which a pressure sensing chip 19 including a pressure sensing part and an electronic circuit, input/output interface terminals 20, and the wire bonding material 17 for electrically connecting the pressure sensing chip 19 and the input/output interface terminals 20 are integrated with a sensor casing (Pressure sensor housing) 21. The input/output interface terminals 20 are provided so as to project from the sensor casing 21. The input/output interface terminals 20 are electrically connected to pressure sensor connector terminals 24, which are arranged in parallel on the same plane as the connector terminals 18, by welding or the like, to thereby input and output signals to and from the outside through the connector 25.

Fixation between the pressure measurement device 5 and the housing 7 is completed by pouring a cast resin (filling material) 26 into a cavity formed in the housing 7. A pressure within the main air flow passage 1 can be measured by allowing communication with the location, at which the pressure sensing chip 19 is placed, through the sensor installation hole 4 and a pressure intake hole 27.

In the case of integrating the pressure measurement device 5 with the heating resistor type mass air flow measurement device 3, it is essential for the housing 7 of the heating resistor type mass air flow measurement device 3 to ensure robustness with respect to a temperature environment, a mechanical vibration environment, a shock environment, and the like which are required when the housing is used in an intake system of an automobile as a structure. Accordingly, a resin material that is excellent in ductility and toughness and has a required mechanical strength as well as a resistance to deterioration due to a temperature change and a humidity change is suitably used. For example, a PBT resin reinforced with fiberglass or the like is used and molded.

As a material of the sensor casing 21 of the pressure measurement device 5, a material having a small linear expansion coefficient, such as PPS, is selected. That is, the resin forming the sensor casing 21 has a linear expansion coefficient smaller than a linear expansion coefficient of the resin forming the housing 7 (the linear expansion coefficient has a relationship satisfying "sensor casing 21<linear expansion coefficient α<housing 7").

In this case, the pressure measurement device 5 needs to have a structure in which electronic components 22, such as a chip capacitor, are externally mounted in order to improve the electromagnetic interference preventing function. In this embodiment, the electronic components 22 are mounted on the input/output interface terminals 20, i.e., on the side of the pressure measurement device 5, through a connection paste material 23 such as a solder or a conductive adhesive. In other words, a structure is employed in which the electronic components 22 are mounted on the side of the component packaged with a resin having a small linear expansion coefficient.

In this structure, since the sensor casing 21 is formed of a resin material having a small linear expansion coefficient, the sensor casing 21 hardly expands or contracts even when the ambient temperature changes. Therefore, a variation in a distance between the terminals on the input/output interface terminals 20 is minimized. Furthermore, the reliability of connecting parts can be ensured even when the electronic components are connected to bridge the input/output interface terminals. Consequently, the mounting of the electronic components 22 at such a position enables improvement in the reliability of connecting parts of the electronic components 22 and the input/output interface terminals 20.

If the electronic components are mounted on the side of the PBT resin (the housing 7), the connector terminals integrally formed with the thermal expansion/contraction of the PBT resin are also displaced, so that the connecting parts of the electronic components are affected by a repeated stress.

Figure 2:
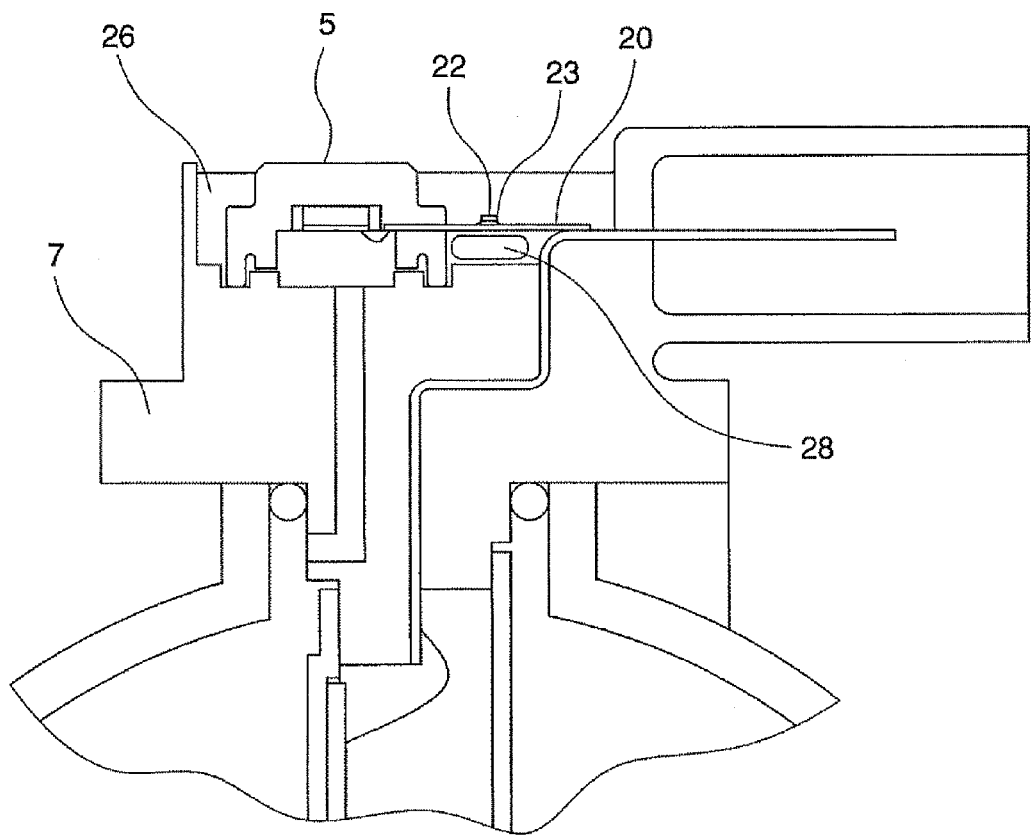
FIG. 2 is a diagram of a sensor structure showing an embodiment of the present invention.

FIG. 2 is a partial sectional view of the pressure measurement device 5. Fixation between the pressure measurement device 5 and the housing 7 is completed by pouring the cast resin 26 into the cavity formed in the housing 7. Meanwhile, it is necessary to ensure the fixation of the electronic components 22 connected onto the input/output interface terminals 20 through the connection paste material 23, and to ensure a sufficient reliability in connection of the electronic components 22 under an assumed environment within an engine room of an automobile. In this case, it is effective to cover the entirety of the electronic components 22 and the input/output interface terminals 20 with the cast resin 26.

In order to completely coat the cast resin 26 over the periphery of the electronic components 22 and the input/output interface terminals 20, it is necessary to improve flow-in or routing of the cast resin 26. For this reason, no structure is disposed below the input/output interface terminals 20 in the region where the electronic components 22 are mounted, and an interspace 28 is provided below the input/output interface terminals 20. The interspace 28 preferably has a thickness as twice or more thick as the thickness of the input/output interface terminals 20. This structure makes it possible to cover the entire periphery of the electronic components 22 and the input/output interface terminals 20 with one type of cast resin 26, which results in improvement in the reliability of connecting parts of the electronic components 22.

Figure 3:
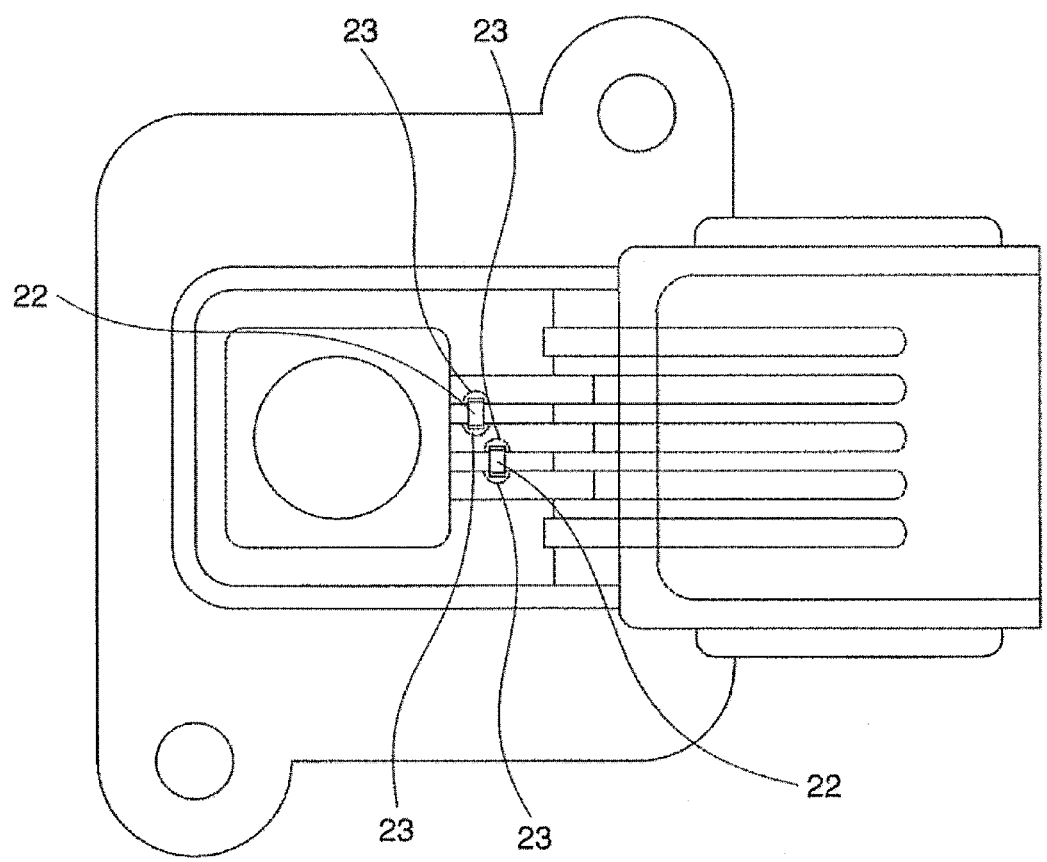
FIG. 3 is a diagram of a sensor structure showing another embodiment of the present invention.

FIG. 3 is a diagram showing another embodiment relating to a method of mounting the electronic components 22.

In the case where two or more electronic components, such as a capacitor, are mounted on the input/output interface terminals 20 in order to improve the electromagnetic interference preventing function of the pressure measurement device 5, the electronic components 22 are mounted in a staggered manner. In the case where electrodes of two components are connected on one terminal, it is preferable to prevent the connection paste materials 23 from being in contact with each other. If the connection paste materials 23 are in contact with each other, the connection paste materials 23 adhere with each other. This causes a failure in the connecting parts, such as a crack due to a residual stress, after heat curing of a paste. The mounting of the electronic components 22 in a staggered manner allows the distance between the adjacent connection paste materials 23 to be sufficiently ensured.

Figure 4:
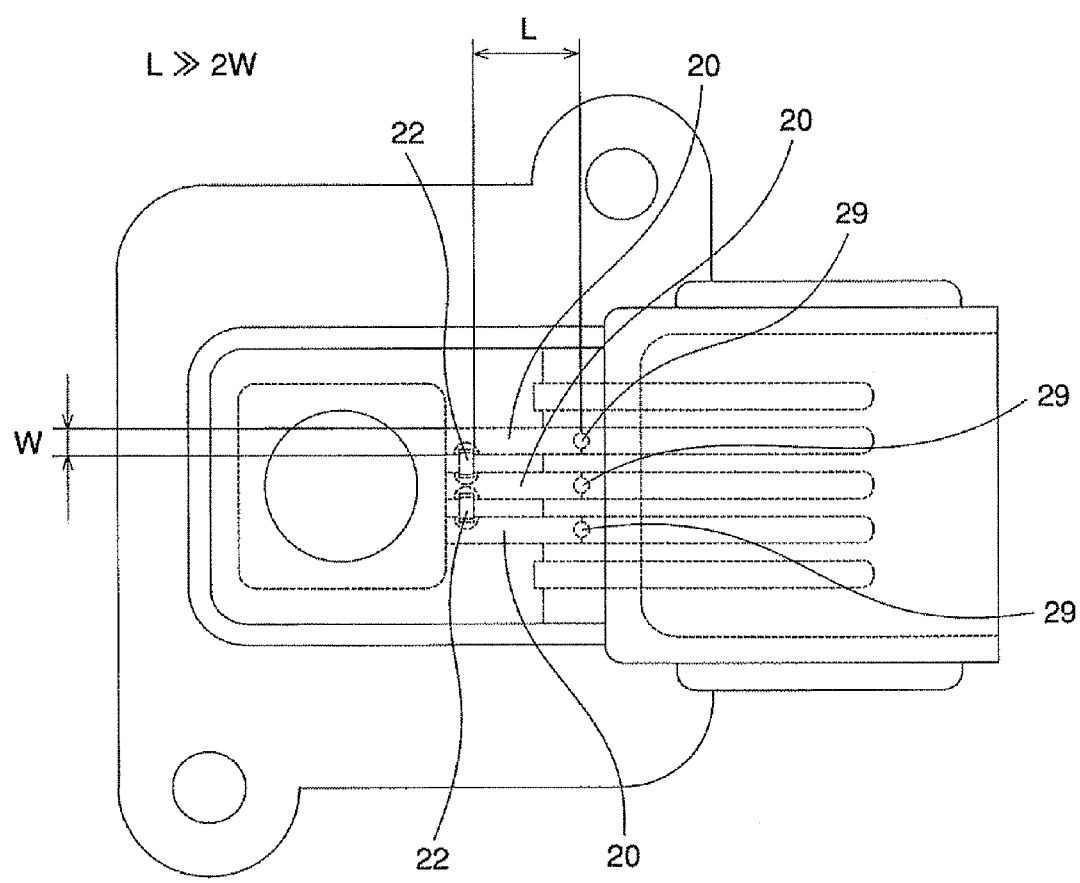
FIG. 4 is a diagram of a sensor structure showing still another embodiment of the present invention.

FIG. 4 is a diagram showing still another embodiment relating to the method of mounting the electronic components 22.

In the case where electronic components, such as a capacitor, are mounted on the input/output interface terminals 20 in order to improve the electromagnetic interference preventing function of the pressure measurement device 5, the electronic components 22 are disposed at a location close to the sensor casing 21 of the pressure measurement device 5. The sensor casing 21 is formed of a resin material having a small linear expansion coefficient, such as PPS. Accordingly, even when the ambient temperature changes, the sensor casing 21 hardly expands or contracts, so that a variation in the distance between the terminals on the input/output interface terminals 20 is minimized at a location closest to the sensor casing 21. The mounting of the electronic components 22 at such a location improves the reliability in connecting parts.

Further, welding parts 29 are preferably provided at positions as far away as possible from the electronic components 22. Assuming that the width of the input/output interface terminals 20 is represented by W, a distance of 2W or more between the electronic components 22 and the welding parts 29 is ensured. In FIG. 4 the distance between the electronic components 22 and the welding parts 29 is represented by L. When the distance between the electronic components 22 and the welding parts 29 is ensured in this manner, a stress which is generated during or after welding and is applied to the input/output interface terminals 20 can be alleviated. This is effective for improvement in reliability of connecting parts of the electronic components 22.

Figure 5:
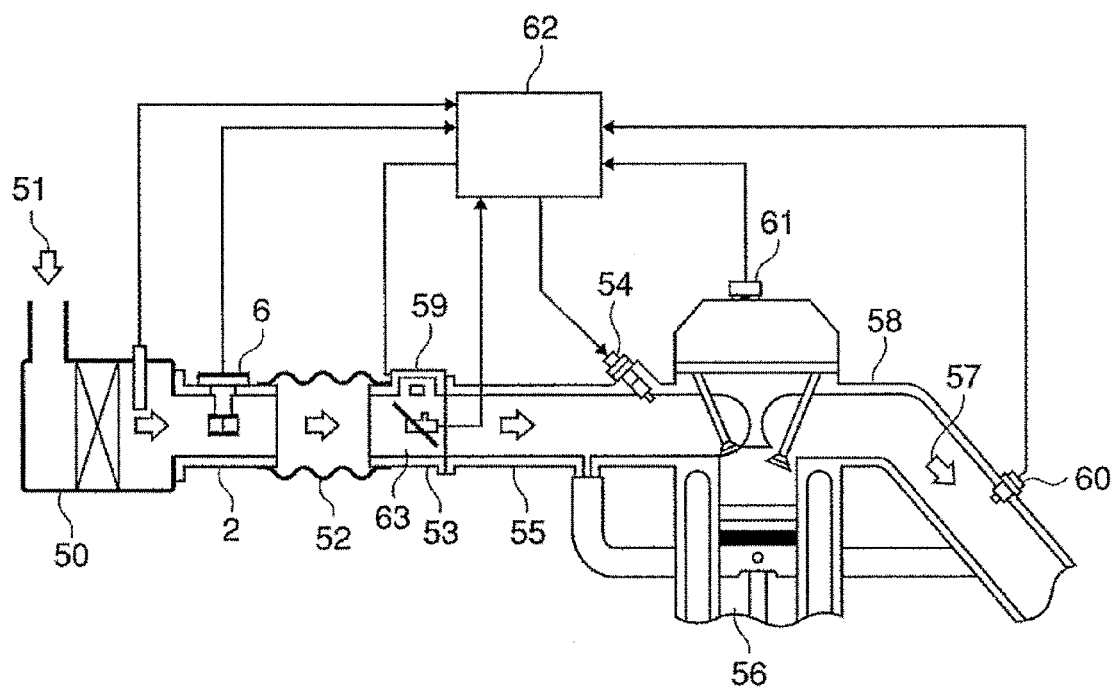
FIG. 5 shows an embodiment in which the present invention is applied to an electronic fuel injection type internal combustion engine.

Lastly, an embodiment in which the multifunction sensor 6 is applied to an electronic fuel injection type internal combustion engine will be described with reference to FIG. 5.

An intake air 51 taken from an air cleaner 50 is introduced into an engine cylinder 56 through an intake manifold 55. The intake manifold 55 includes the main air flow passage component 2 into which the multifunction sensor 6 is inserted, an intake air duct 52, a throttle body 53, and a fuel injector 54 supplied with fuel. On the other hand, an exhaust gas 57 generated in the engine cylinder 56 is discharged through an exhaust manifold 58.

An engine control unit 62 receives an air flow signal, a humidity signal, a pressure signal, and a temperature signal, which are output from the multifunction sensor 6, a throttle valve angle signal output from a throttle angle sensor 59, an oxygen concentration signal output from an oxygen meter 60, which is provided in the exhaust manifold 58, and an engine speed signal output from an engine speed meter 61, for example. The engine control unit 62 sequentially calculates these signals to obtain an optimum amount of fuel injection and an optimum output torque. The engine control unit 52 uses these values to control the fuel injector 54 and the throttle valve 63.

Description of Symbols

1 Main air flow passage
2 Main air passage component (Airflow tube)
3 Heating resistor type mass air flow measurement device
4 Sensor installation hole
5 Pressure measurement device
6 Multifunction sensor
7 Housing
8 Base plate
9 Electronic circuit board
10 Cover
11 Heating resistor
12 Air temp compensation resistor
13 Intake air temperature sensor
14 Bypass air passage
15 Bypass air passage structural part
16 Seal material
17 Wire bonding material
18 Connector terminals
19 Pressure sensing chip
20 Input/output interface terminals
21 Sensor casing (Pressure sensor housing)
22 Electronic component
23 Connection paste material
24 Pressure sensor connector terminals
25 Connector
26 Cast resin
27 Pressure intake hole
28 Interspace
29 Welding part
50 Air cleaner
51 Intake air
52 Intake air duct
53 Throttle body
54 Fuel injector
55 Intake manifold
56 Engine cylinder
57 Exhaust gas
58 Exhaust manifold
59 Throttle angle sensor
60 Oxygen meter
61 Engine speed meter
62 Engine control unit
63 Throttle valve

What is claimed is:

1. A sensor structure comprising:
a housing made of a first resin and including a connector for inputting and outputting a signal to and from an outside;
a sensor for detecting a first physical quantity; and
a sensor for detecting a second physical quantity, the sensors being mounted in the housing, wherein
the sensor for detecting the second physical quantity is integrally formed with a sensor casing made of a second resin in such a manner that a plurality of input/output terminals electrically connected to the connector project from the sensor casing,
the second resin has a linear expansion coefficient smaller than a linear expansion coefficient of the first resin,
a chip-shaped electronic component external from the sensor casing is electrically connected to bridge the plurality of input/output terminals of the sensor casing, and the housing includes a space to be filled with a cast resin, the space being located beneath a junction between the chip-shaped electronic component and the input/output terminals.

2. The sensor structure according to claim 1, wherein
the entirety of the input/output terminals and electronic component is covered by the cast resin, and
the housing and the sensor for detecting the second physical quantity are integrally fixed to each other by a filling material.

3. The sensor structure according to claim 1, wherein the first physical quantity is an air flow and the second physical quantity is a pressure.

4. The sensor structure according to claim 1, wherein two or more electronic components are electrically connected to the input/output terminals, and the two or more electronic components are mounted in a staggered manner.

5. The sensor structure according to claim 1, wherein the electronic component is mounted in the vicinity of an area where the input/output terminal protrudes from the sensor casing.

6. The sensor structure according to claim 5, wherein assuming that a width of one of the input/output terminals is represented by W, a distance from a junction between the input/output terminal and the connector to the electronic component is 2W or more.

* * * * *